United States Patent [19]

Kern et al.

[11] Patent Number: 4,647,776

[45] Date of Patent: Mar. 3, 1987

[54] DISCRIMINATING FIRE SENSOR WITH THERMAL OVERRIDE CAPABILITY

[75] Inventors: Mark T. Kern, Goleta; Robert J. Cinzori, Santa Barbara, both of Calif.

[73] Assignee: Santa Barbara Research Center, Goleta, Calif.

[21] Appl. No.: 873,083

[22] Filed: Jun. 3, 1986

Related U.S. Application Data

[63] Continuation of Ser. No. 419,872, Sep. 20, 1982.

[51] Int. Cl.[4] .................... G01J 1/00

[52] U.S. Cl. .................... 250/339; 250/342

[58] Field of Search .................... 250/338, 339, 342

[56] References Cited

U.S. PATENT DOCUMENTS 3,825,754 7/1974 Cinzori et al. .................... 250/338

3,931,521 1/1976 Cinzori .................... 250/339

*Primary Examiner*—Janice A. Howell

*Attorney, Agent, or Firm*—Ronald L. Taylor; A. W. Karambelas

[57] ABSTRACT

A fire sensor apparatus of the type having a discriminating fire sensor portion for detecting radiation in at least two different spectral bands associated with a fire and for providing an output signal in response to predetermined amounts of radiation in those spectral bands associated with a particular size and type of fire to be detected. A novel heat sensor channel is provided, which provides a further output signal in response to an amount of detected heat radiation greater than that associated with the fire of the type and size to be detected. A heat override function is thereby provided to permit the generation of an output signal even when contaminants block the action of the discriminating fire sensor portion.

14 Claims, 4 Drawing Figures

DISCRIMINATING FIRE SENSOR WITH THERMAL OVERRIDE CAPABILITY

This is a continuation of United States patent application Ser. No. 419,872, filed Sept. 20, 1982.

BACKGROUND OF THE INVENTION

1. Field of the Invention

This invention relates generally to fire and explosion sensing and suppression systems, and more particularly, to such systems in which radiation is detected in at least two different spectral bands.

2. Background Art

Certain types of fire suppression systems utilize fire sensors having multiple signal processing channels which respond to fire- or explosion-produced electromagnetic radiation to generate a fire suppression command output signal. The fire suppression command output signal is used to trigger the release of a fire suppression agent, such as halon gas.

Such systems employ more than one signal processing channel in order to discriminate against radiation which is not associated with a fire or explosion requiring suppression. For example, hydrocarbon fires produce long wavelength infrared radiation in the 6 to 30 micrometer spectral band, and also short wavelength radiation in the 0.7 to 1.2 micrometer spectral band, at characteristic relative intensities. Multiple channel fire sensors have been designed which produce an output signal only when radiation is detected in each of the aforementioned spectral bands above predefined levels associated with a fire of a predetermined size, and in relative amounts associated with a hydrocarbon fire. Such systems are resistant to false triggering from, for example, direct exposure to a high intensity lamp, heater, flash light or the like. One such multiple channel fire suppression system of the above type is disclosed and claimed in U.S. Pat. No. 3,931,521, which issued to R. J. Cinzori and which is assigned to the present assignee.

While the aforementioned fire suppression systems operate satisfactorily in many environments, nonetheless certain adverse conditions may occur which interfere with the operation of one or more of the radiation channels. For example, if an area being monitored by such a fire sensor system becomes filled with smoke, while detection in the long wavelength region may be substantially unaffected, short wavelength radiation from a potentially dangerous fire may be obscured from the sensor system by the smoke.

Another, quite serious problem which can occur in the operation of multi-channel fire suppression systems is the failure to operate because of contamination on the sensor windows. For example, multi-channel fire sensor systems are used in armored personnel carriers to protect the occupants from fires which may start in the engine compartment of the vehicle. The sensors are placed physically within the engine compartment in such instances, thus affording as early as possible detection of an engine compartment fire. Such a armored carrier may be put to considerable use, and go for a considerable length of time before a fire occurs requiring the activation of the suppression system. Over such an extended period of time, the windows of the sensors of a fire suppression system located within the engine compartment are likely to become covered over with a film of contaminates including grease, sand, dust, and other components frequently found in such a location. A sufficiently thick build-up of such contaminants will prevent the effective operation of the typical multi-channel fire suppression system, primarily due to blockage of the short wavelength channel thereof.

The failure of a fire suppression system to operate properly, for example, to suppress a fire in the engine compartment of an armored personnel carrier, could be disastrous to the personnel the fire suppression system is designed to protect. There is therefore a need for an improved multiple channel fire sensor system which overcomes the aforementioned problems. In particular, there is a need for an improved fire sensor system which provides adequate discrimination against false triggering signals, while at the same time, which provides for the timely production of a fire suppression command output signal even if radiation obscuring conditions occur which tend to interfere with the proper operation of the system.

SUMMARY OF THE INVENTION

The present invention overcomes the above-described problems associated with such radiation blocking conditions in a multiple channel fire suppression system. The present invention provides a discriminating fire sensor for detecting fire in a predefined area by detecting radiation in at least two different spectral bands associated with a fire. The discriminating fire sensor provides an output signal in response to predetermined amounts of radiation in those spectral bands, associated with a fire of the type and size to be detected. A special heat sensor channel is also provided which generates an output signal in response to a predetermined amount of heat in the area.

The present invention represents a significant advance in the field of optical fire sensor systems. In particular, the present invention provides the advantages of prior art multi-channel fire sensor systems in discriminating between fire- or explosion-produced radiation and radiation associated with events other than fires or explosions to be detected, while at the same time, providing protection against fire conditions which would otherwise go undetected because of the occurrence of radiation obscuring phenomena in the environment of the fire sensor system. Other features and advantages of the present invention will become apparent from a consideration of the following detailed description of the present invention, taken in conjunction with the drawings.

DETAILED DESCRIPTION OF THE INVENTION

Figure 1:
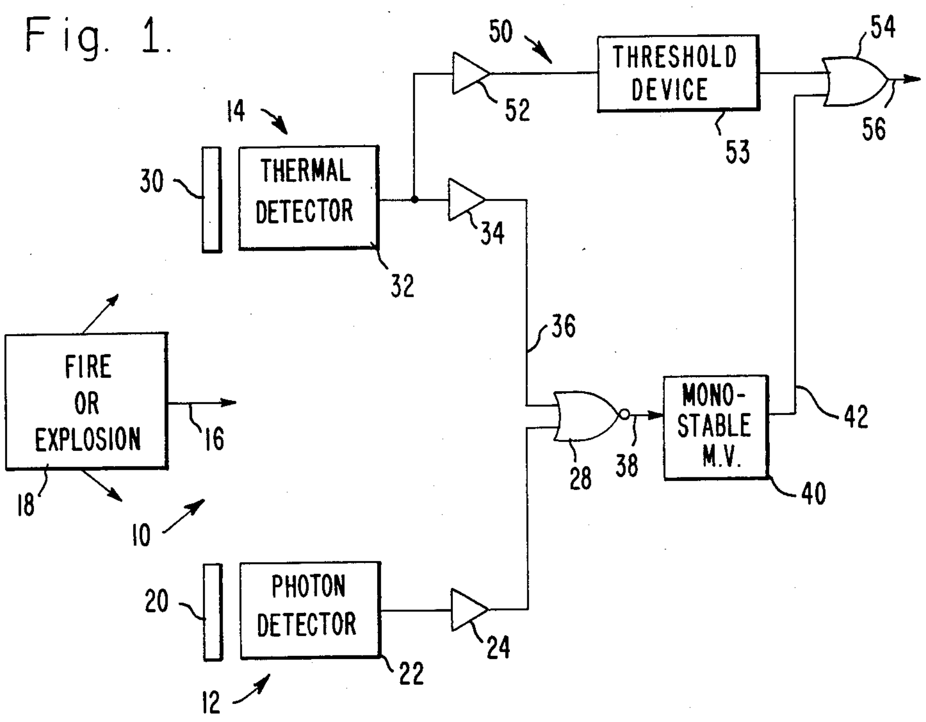
FIG. 1 is a block diagram representation of the fire and explosion system according to the invention.

The preferred embodiment of the present invention utilizes an existing multi-channel fire and explosion detection system, and also provides an additional special channel capable of providing a thermal override protection capability to the system. FIG. 1 illustrates this embodiment. Many of the elements of the embodiment of FIG. 1 are disclosed and described in detail in prior U.S. Pat. No. 3,931,521 (the '521 patent), in connection with FIG. 1 thereof. The '521 patent is incorporated herein by reference in its entirety.

Briefly summarizing the description of those elements of the embodiment shown in FIG. 1 herein which are common with the embodiment shown in FIG. 1 of the '521 patent, the multi-channel fire detector 10, includes a short wavelength radiation responsive channel 12 and a long wavelength radiation responsive channel 14 coupled respectively to receive radiant energy 16 from a nearby or remote fire or explosion 18. The system 10 is typically designed so that it is highly responsive to high energy fuel-type explosions out to distances on the order of six yards. The radiant energy 16 of interest in channel 12 is that radiation in the near infrared region of the electromagetic frequency spectrum, whereas the radiant energy from source 18 of interest in channel 14 lies in the far infrared region of the electromagnetic frequency spectrum.

The short wavelength channel 12 includes a suitable conventional optical filter 20 for passing radiation wavelengths only in the spectral band of interest, for example, in the 0.7 to 1.2 micron range. The filtered radiation impinges on a detector 22, such as a silicon photodetector, which generates an output detection signal which is provided to the input of an amplifier 24. The amplifier 24 has its output connected as shown to one input 26 of a NOR and threshold gate 28.

The long wavelength channel 14 includes a conventional optical filter 30 for passing radiation wavelengths in a range different from that of optical filter 20, for example, in the 7 to 30 micron range. The filtered radiation impinges on a thermal detector 32. This detector may, for example, be a thermopile, and has its output connected to the input of a frequency compensating amplifier stage 34.

Alternatively, the detector may be heat wire, pneumatic heat detector, or thermocouple. Amplifier 34 has its output connected to a second input 36 of the NOR and threshold gate 28. Gate 28 is operative in response to input signals on lines 26 and 36 to generate an output pulse on line 38 when predetermined amounts of radiation are detected by detectors 22 and 32 in predetermined relative proportions, as explained in detail in the '521 patent. The output pulse on line 38 triggers a monostable multivibrator 40 to generate an output pulse of a desired time duration sufficient to ensure the triggering of a subsequent stage, such as a suitable fire suppressant release mechanism.

A signal will thus appear on line 42 only when both long and short wavelength energy is detected at levels above the predetermined threshold levels. These threshold levels are controlled internally in the electronics of amplifiers 24 and 34 and NOR and threshold gate 28. Thus, the gain of amplifier 34 is selected such that the known threshold level required to activate the input of NOR gate 28 is reached by the output of thermal detector 32 when the selected level of radiation is detected. Similar considerations apply to channel 12.

It will be appreciated that the spectral ranges associated with channels 12 and 14 need not be in the 0.7 to 1.2 micron and 7 to 30 micron ranges, respectively. Other spectral ranges may be selected as desired without departing from the spirit or scope of the invention. Such considerations are considered well within the scope of one having ordinary skill in this art.

In accordance with the present invention, an additional channel 50 is also provided. This additional circuit channel 50 comprises a further amplifier 52, a threshold device 53 and an OR gate 54, one input of which is connected to the output of threshold circuit 53, and the other input of which is connected to line 42 which is the output of monostable multivibrator 40. The output of OR gate 54 is connected to a signal line 56 which is the output of the system 10.

The gain of amplifier 52 and the threshold voltage of threshold device 53 are selected such that the signal level at the output of thermal detector 32 activates the input of threshold circuit 53 at a selected level greater than that at which line 36 triggers the input of NOR gate 28. In the preferred embodiment, this selected threshold level is 10 times greater than the level which causes NOR gate 28 to be triggered. Other levels for the triggering of channel 50 may be selected in accordance with the present invention. In some circumstances, for example, the speed at which a fire is detected may be a far more important consideration than immunity from false triggering. In such cases, a level less than the level described above may be selected. On the other hand, under other circumstances, the protection of a limited amount of fire suppressant from release due to false triggering, and the maximization of the probability that such material will be released only in response to a fire may be the overriding considerations. In such cases, the system designer may choose a greater triggering level than that described above. Such considerations and selections are well within the scope of one having ordinary skill in this art.

It will be appreciated that channel 50 need not depend upon the output of detector 32 for a signal. In fact, a separate detector may be utilized to provide a signal to amplifier 52, if desired.

Figure 2:
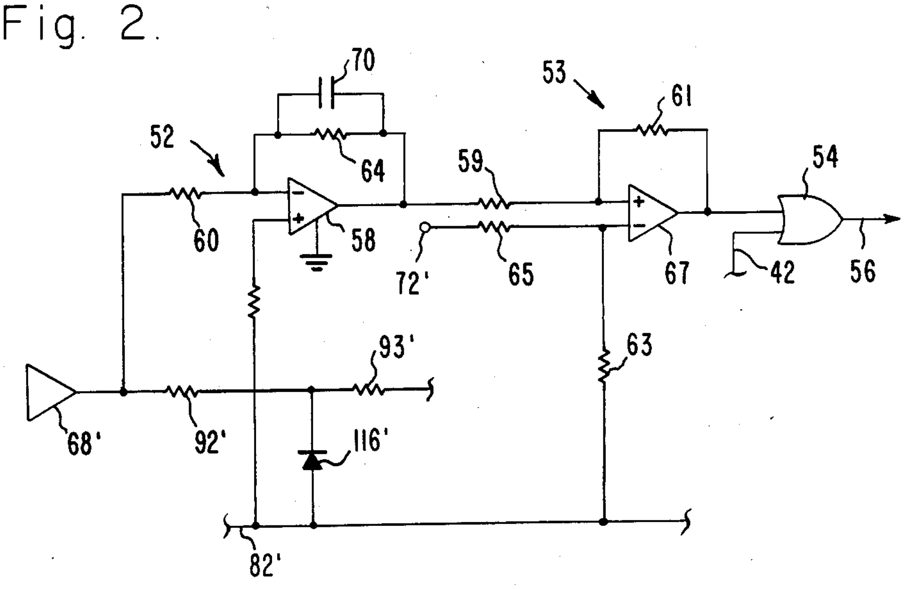
FIG. 2 is a schematic diagram of a portion of the detection system shown in FIG. 1.

FIG. 2 is a schematic diagram of that portion of the system shown in FIG. 1 comprising channel 50, plus selected additional circuit elements to aid in explaining the interconnections of channel 50 to other parts of the circuits of FIG. 1. The schematic diagram of FIG. 2 herein should be considered in conjunction with the specification of the '521 patent, and particularly in connection with FIG. 3 thereof which is a schematic diagram of the circuit of FIG. 1 thereof.

Figure 3:
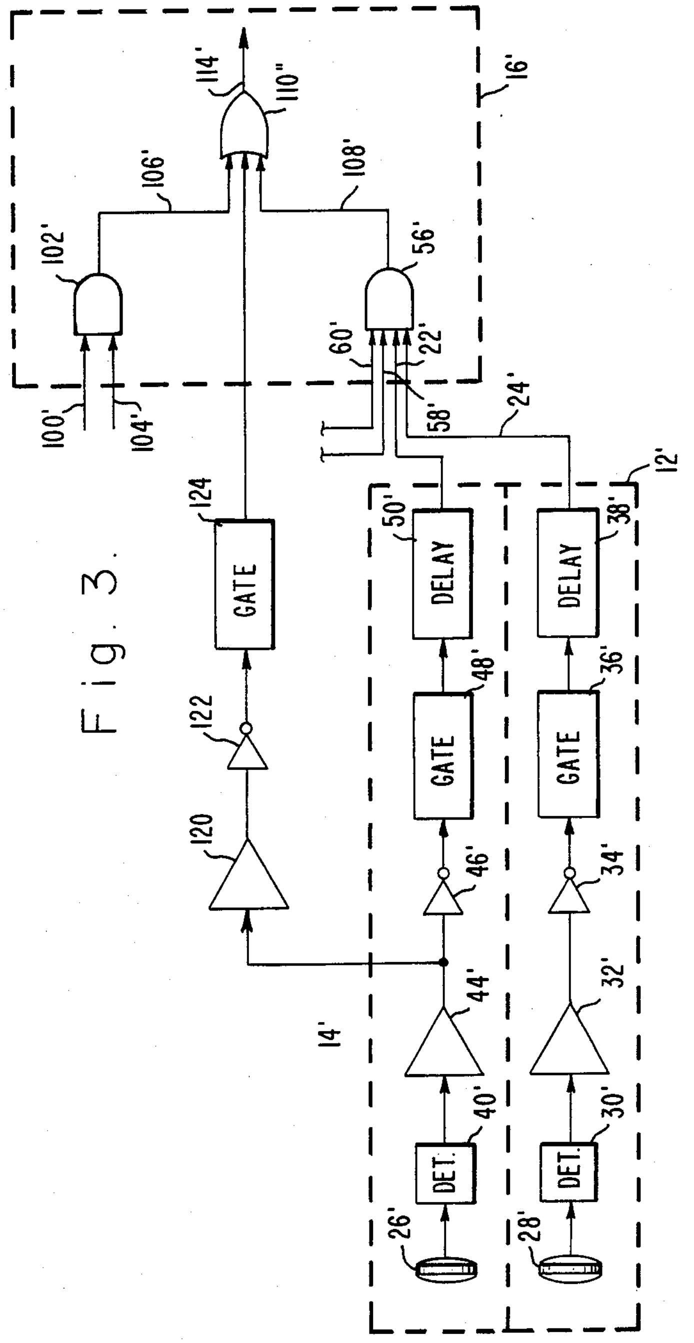
FIG. 3 is a partial block diagram of a further embodiment of a fire and explosion detection system according to the invention.

Referring now to FIG. 2 herein, it will be noted that amplifier device 68', resistors 92' and 93', diode 116', and circuit reference potential points 72' and 82' are common with the circuit shown in FIG. 3 of the '521 patent.

Amplifier device 58 is a conventional differential amplifier. Resistors 60, 62 and 64 and capacitor 70 are selected according to known principles to provide the aforementioned selected amount of gain for amplifier 52 and to provide a frequency response of approximately 0.3 Hz. This frequency response of 0.3 Hz is designed into the amplifier 52 of channel 50 of the preferred embodiment to suppress the AC component of the composite waveform applied to the input of amplifier 52.

Threshold circuit 53 is based upon a further differential amplifier device 67 having resistors 59, 61, 63 and 65 connected in conventional fashion, as shown, to provide a comparator function so as to provide an input signal to OR gate 54 when the output of amplifier 52 exceeds the selected threshold level, described above, which is determined by the values of resistors 63 and 65 which are connected together in a voltage divider configuration between reference potential point 82 and 72.

The output of threshold circuit 53 is connected to one input of OR gate 54 as shown. The other input of OR gate 54 is connected to line 42 (FIG. 1).

The present invention is readily adaptable for use in connection with many different multi-channel fire and explosion sensor systems to provide the novel thermal override protection provided by the present invention. For example, the present invention can be implemented in two somewhat different ways in connection with a multi-channel fire detection system such as that disclosed in U.S. Pat. No. 3,825,754 which issued on July 23, 1974 to Robert J. Cinzori and Gerald F. Stapleton, and which is assigned to the assignee of the present invention. These two implementation are discussed below in connection with FIGS. 3 and 4.

FIG. 3 is the first such implementation in connection with the '754 patent. The circuit shown in FIG. 3 is based on FIG. 1 of the '754 patent, and includes all of the elements contained therein, substantially as disclosed therein, except as modified as described herein. Circuit elements in FIG. 3 herein which are common to FIG. 1 of the '754 patent are designated in FIG. 3 herein with a primed reference character having the same number value as the corresponding element in FIG. 1 of the '754 patent. Thus, for example, circuit blocks 12', 14', and 16' in FIG. 3 herein correspond to blocks 12, 14 and 16, respectively, in FIG. 1 of the '754 patent.

Briefly, the circuit shown in FIG. 1 of the '754 patent is a dual spectrum infrared fire detection system having two main channels 12, 14, which provide a discriminating fire detection capability, and having a third "Round Channel" (not shown herein). The Round Channel provides further discrimination against high energy exploding rounds of ammunition, by temporarily disabling the main detection channels in response to detected radiation from an exploding round of ammunition, and thus protects against false triggering from such exploding rounds. The circuit also has fail-safe logic and detection circuitry to override the temporary disablement in the event a delayed fire is produced which would otherwise escape detection.

Turning now to FIG. 3, the two main channels 12' and 14' are shown, as are AND gate 56' which outputs a signal in response to the outputs of main channels 12' and 14', subject to the aforementioned high energy ammunition round discrimination logic function. AND gate 102' outputs a signal pursuant to the implementation of the aforementioned fail-safe logic. The outputs of AND gates 56' and 102' are applied to the respective inputs of OR gate 110'', which has as an output line 114'. Note that OR gate 110'' has three inputs, while OR gate 110 in the '754 patent has only two, hence the double prime reference. A detailed description of the interconnection of and the operation of the aforementioned circuit elements of FIG. 3 can be found in the specification of the aforementioned '754 patent.

In accordance with the present invention, the input of a further amplifier 120 is connected to the output of amplifier 44'. The output of amplifier 120 is connected to the input of an inverter 122, the output of which is connected to the input of a threshold gate 124. The output of threshold gate 124 is connected to a third input of OR gate 110''.

In operation, the gains of amplifier 120 and inverter 122 are set in conjunction with the threshold level of threshold gate 124 so as to cause the triggering of threshold gate 124 when a predetermined level of long wavelength radiation is received by main channel 14', so as to implement the thermal override function of the present invention.

Figure 4:
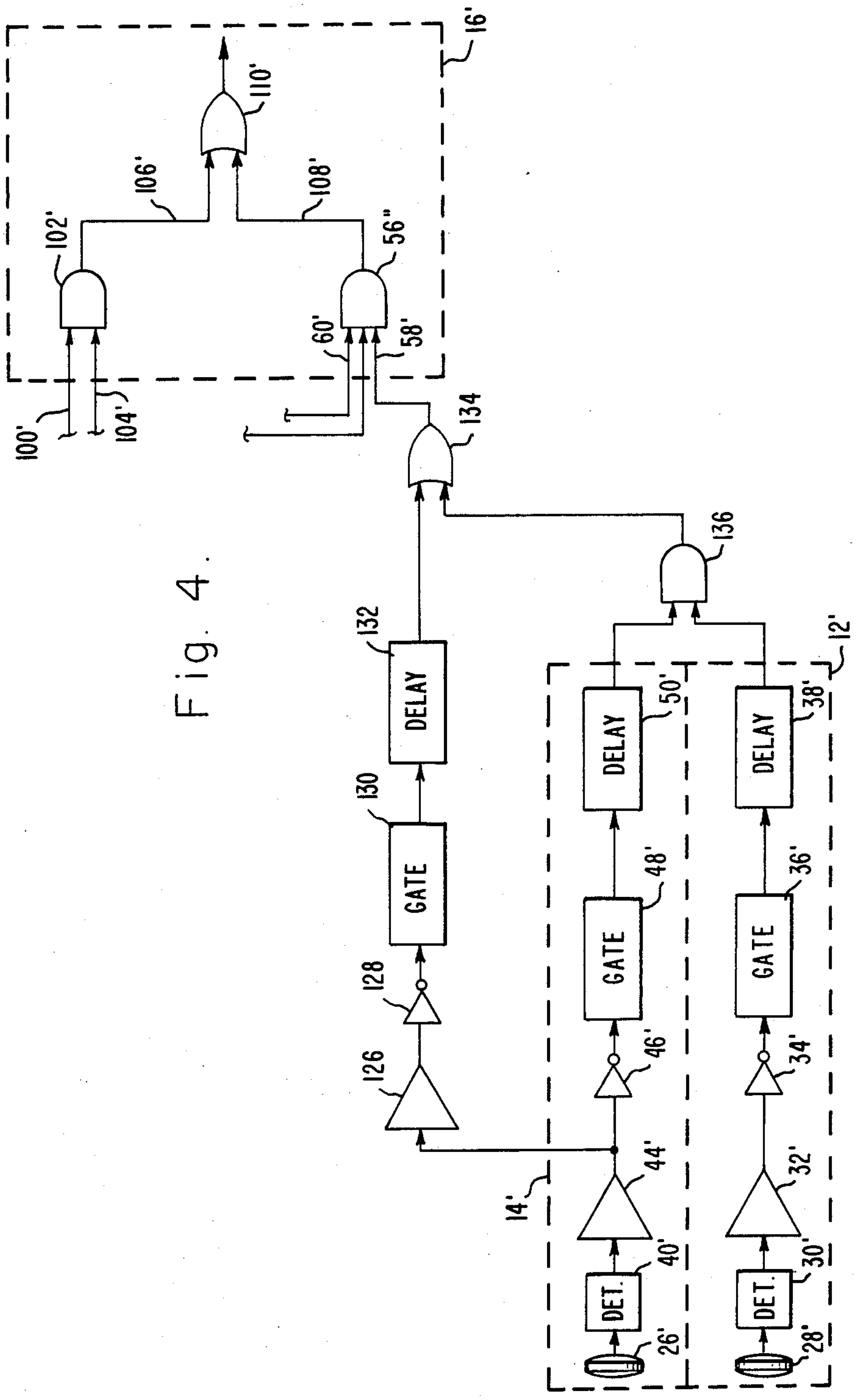
FIG. 4 is a partial block diagram of a still further embodiment of a fire and explosion detection system according to the invention.

FIG. 4 shows an additional implementation of the present invention in connection with the circuit shown in FIG. 1 of '754 patent. As in FIG. 3, those circuit elements common to FIG. 1 of the '754 patent are shown in FIG. 4 herein with primed reference numerals. However, since AND gate 56'' has three inputs as compared with four inputs in '754 patent, it is shown with a double prime designation herein to show that it differs slightly from the '754 patent.

In accordance with the present invention, the input of a further amplifier 126 is connected to the output of amplifier 44', as is the case in FIG. 3. The output of amplifier 126 is connected to the input of an inverter 128, the output of which is connected to a threshold gate 130. The output of threshold gate 130 is connected to the input of a time-delay stage 132, the output of which is connected to a first input of an OR gate 134. The outputs of main channels 12' and 14' are connected to the respective inputs of an AND gate 136, the output of which is connected to the second input of OR gate 134. The output of OR gate 134 is connected to the third input of a three input AND gate 56''. The other two inputs of AND gate 56'' are connected to lines 58' and 60', further details of which can be found in the aforementioned '754 patent.

In operation, the gains of amplifier 126 and inverter 128 are set in connection with the threshold level of threshold gate 130, as described above in connection with FIG. 3. The timing of delay device 132 is set to be substantially the same as the timing of delay devices 38' and 50', details of which can be found in the aforementioned '754 patent. In the preferred embodiment according to this implementation, time-delay stage 132 provides at its output the same signal as that applied to its input, however, delayed by 4 milliseconds. This delay of 4 milliseconds permits the circuit to implement the high energy ammunition round discrimination function by way of AND gate 56'', in an analagous fashion to the function of timing delay stages 38' and 50', as described in detail in the '754 patent.

Thus, it will be appreciated, that the implementation of the present invention shown in FIG. 4 herein utilizes a thermal override channel according to the present invention, which thermal override channel is subject to a high energy ammunition round discrimination logic. This implementation is suitable for applications wherein immunization of the fire detection system from false triggering is an important consideration. Nonetheless, the thermal override channel of the present invention additionally provides protection against the blockage of the fire detection system due to the build-up of contaminants on the windows of the detectors physically located within the vehicle to be protected.

Other embodiments of the present invention may readily be designed by one having ordinary skill in this art once the principles of the present invention disclosed herein are understood.

What is claimed is:

1. A fire sensor apparatus for detecting a fire, comprising:

multi-channel fire sensor means for sensing radiation, including first channel sensing means for detecting radiation in a first spectral band that includes radiation in the 0.7–1.2 wavelength region of the electromagnetic frequency spectrum and for providing a first sensor signal corresponding to the amount of radiation sensed in said first spectral band, second channel sensing means for detecting radiation in a second spectral band that includes radiation in the 7–30 micron wavelength region of the electromagnetic frequency spectrum and for providing a second sensor signal corresponding to the amount of radiation detected in said second spectral band, and gate means responsive to said first and said second channel sensing means for providing a first output signal when said first and said second sensor signals exceed first and second thresholds, respectively, associated with the detection of a predetermined fire to be sensed;

heat sensor means for providing a second output signal in response to a predetermined amount of detected radiation in the 7–30 micron wavelength region associated with heat energy incident on said fire sensor apparatus, said predetermined amount being greater than said second threshold associated with the second channel sensing means;

OR gate means, having first and second inputs connected respectively to receive said first and said second outputs, adapted to provide a third output signal in response to either said first or said second output signals;

high energy ammunition round discrimination means for providing an inhibit signal in response to predetermined detected radiation associated with a high energy ammunition round impacting in the vicinity of said fire sensor apparatus; and output gate means for providing a fourth output signal for activating a fire suppressant in response to said third output signal in the absence of said inhibit signal whereby the second output signal from said heat sensor will normally cause the fire suppressant to be activated even though one or more of the first or second channel sensing means is not operating properly.

2. A fire sensor apparatus according to claim 1 wherein said first and said second channel sensing means include first and second delay means, respectively, for delaying the providing of said first and said second sensor signals, respectively, and wherein said heat sensor means includes third delay means for delaying the providing of said second output signal.

3. A system for detecting a fire and activating a fire suppressant in response thereto, said system comprising:

a primary fire detector having first and second sensor means therein, said first sensor means being adapted to generate a first output signal in response to detection of radiation in a first spectral band exceeding a first predetermined threshold level, said second sensor means being adapted to generate a second output signal in response to detection of radiation in a second spectral band exceeding a second predetermined threshold, said primary fire detector including gating means providing a primary output signal adapted to activate a fire suppressant in response to the generation of the first and second output signals from the sensors of the primary fire detector;

thermal override sensing means for generating an override output signal in response to detection of a predetermined amount of radiation associated with heat exceeding a third threshold level; and activating means for activating a fire suppressant in response to either the generation of the primary output signal from the primary fire detector or the override signal from the thermal override sensing means whereby said thermal override sensing means will cause the fire suppressant to be activated even though one or more of the sensors in the primary fire detector fail to operate properly.

4. The system of claim 3 wherein said first sensor means comprises a sensor for detecting radiation in the 7–30 micron wavelength region and wherein said thermal override sensing means is adapted to generate said override signal in response to detection of radiation in the same wavelength region but in an amount greater than said first threshold.

5. The system of claim 3 wherein the same sensor is used for the first sensor in the primary fire detector and as part of the thermal override sensing means, the thermal override sensing means further including circuitry defining a third threshold level which is greater than said first threshold level whereby the thermal override signal is generated when the detected heat is substantially greater than the heat that would otherwise be detected by the first sensor if it were operating properly.

6. The system of claim 5 wherein the third threshold level is at least 10 times greater than said first threshold level.

7. The system of claim 3 wherein said first sensor comprises a heat wire.

8. The system of claim 3 wherein said first sensor comprises a pneumatic heat detector.

9. The system of claim 3 wherein said first sensor comprises a thermocouple.

10. The system of claim 5 wherein said third threshold means is defined by:

an amplifier for amplifying the output signal from said first sensor, and a threshold signal circuit set in conjunction with the gain of said amplifier to provide said thermal override signal when the first sensor detects radiation exceeding the third threshold level.

11. The system of claim 10 wherein said amplifier is provided with a gain roll-off characteristic above a first predetermined frequency, whereby the AC component of said first sensor is suppressed, as compared with the DC components thereof, by the action of said amplifier.

12. The system of claim 11 wherein said threshold signal circuit comprises a differential amplifier, one input of which is connected to a reference signal source, and the other input of which is connected to the output of said amplifier.

13. The system of claim 3 wherein said activating means comprises an OR gate having input coupled for receipt of said primary output signal and said thermal override signal.

14. The system of claim 3 which further comprises:

high energy ammunition round discrimination means for providing an inhibit signal in response to predetermined detected radiation associated with a high energy ammunition round impacting in the vicinty of said fire detector;

first gating means adapted to receive said inhibit signal and said primary output signal from the fire detector, adapted to provide a given output in response to the generation of said primary output signal in the absence of said inhibit signal; and wherein said activating means includes OR gate means for receiving the output of said gating means and the thermal override signal.

* * * * *